A. S. FROSLID.
LOG SAWMILL.
APPLICATION FILED APR. 4, 1910.
981,255.
Patented Jan. 10, 1911.
2 SHEETS—SHEET 1.
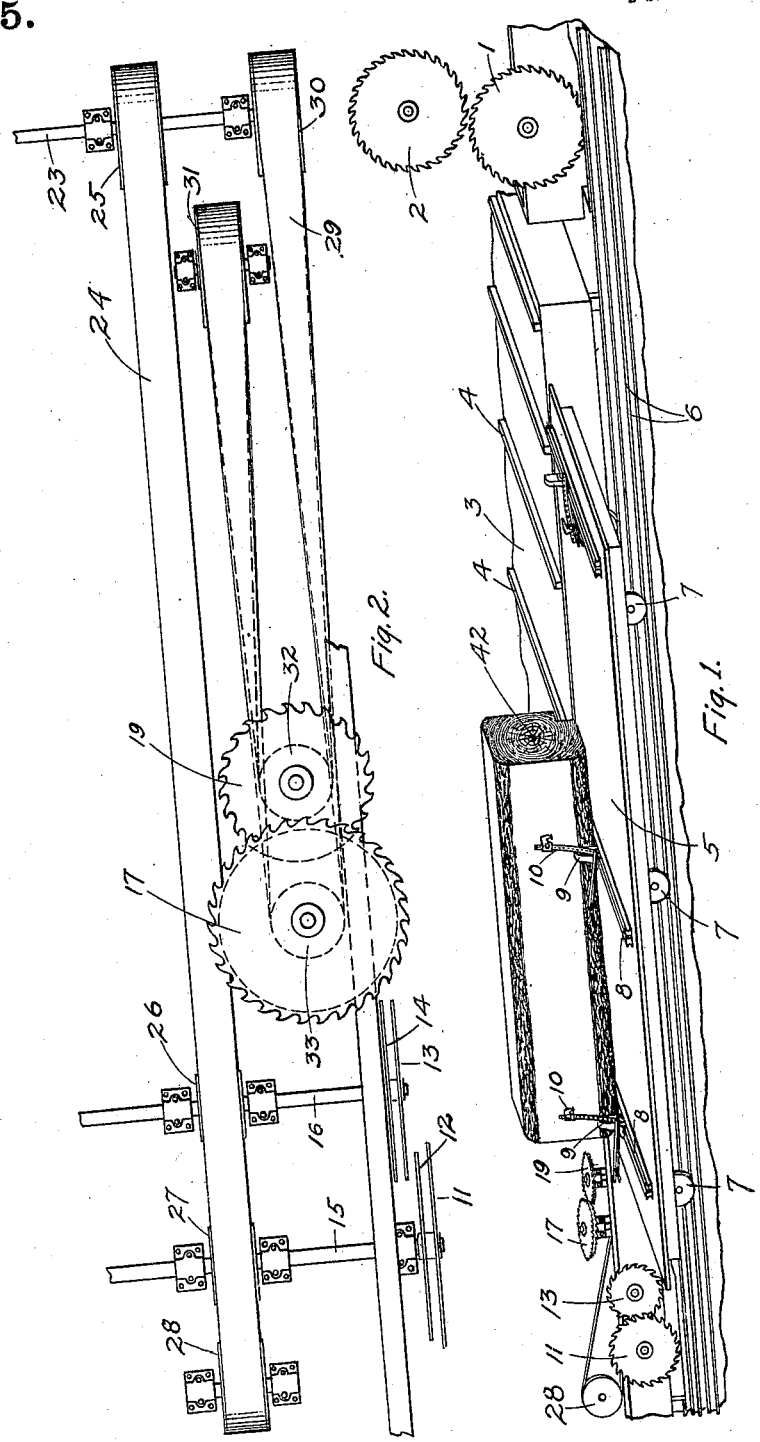
Witnesses:
T. J. Glover
Ralph H. Baughman
Inventor:
Anton S. Froslid

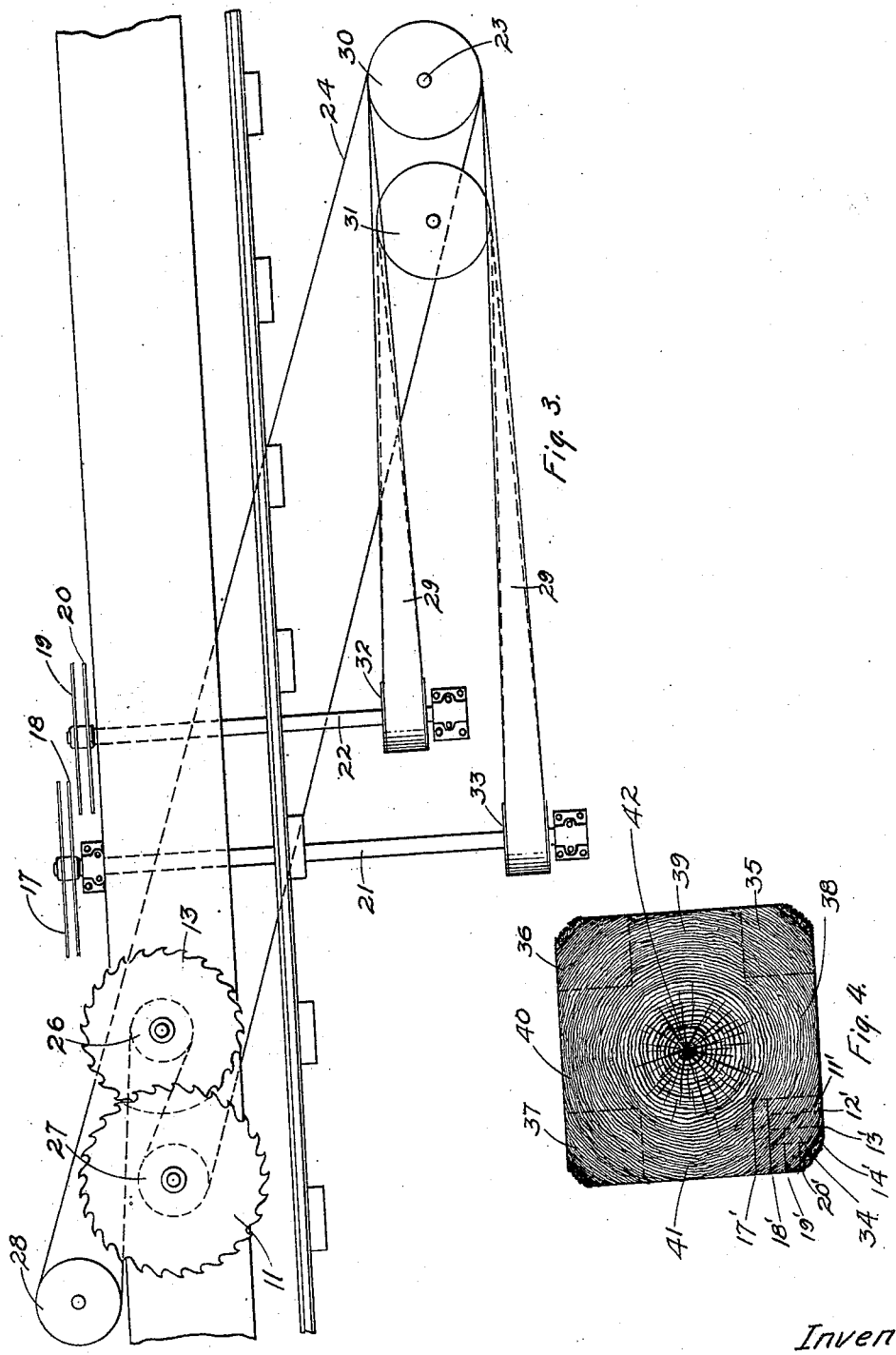

UNITED STATES PATENT OFFICE.

ANTON S. FROSLID, OF PORTLAND, OREGON, ASSIGNOR TO SILKWORTH-FROSLID MACHINERY COMPANY, OF PORTLAND, OREGON, A CORPORATION OF OREGON.

LOG-SAWMILL.

981,255.  Specification of Letters Patent.  Patented Jan. 10, 1911.

Application filed April 4, 1910. Serial No. 553,273.

*To all whom it may concern:*

Be it known that I, ANTON S. FROSLID, a citizen of the United States, residing at No. 67 East Twentieth street, in the city of Portland, county of Multnomah, and State of Oregon, have invented a new and useful Improvement in Log-Sawmills, of which the following in a specification.

My invention relates to improvements in log saw mills in which a log carriage is used; and the object of my improvement is to provide means by which the outside layer of material in large logs may be quarter sawed without quarter sawing the central portion of the log, and by means of which the quarter sawing and the common sawing may be done in the same process or handling and to a large extent with the same equipment. I attain this object by the mechanism illustrated in the accompanying drawings, in which—

Figure 1 is a perspective view of the entire combination; Fig. 2, a plan view of my attachment to the sawing mechanism of a mill; Fig. 3, a side elevation of the same; and Fig. 4, a cross section of a log having a diameter of considerable size, showing the kerfs cut by the saws of my attachment.

Similar numerals refer to similar parts throughout the several views.

The saw 1 is the lower saw, and the saw 2 is the upper saw of what is usually termed a double circular head saw. This type of head saw has been selected for this illustration because it is the one most commonly used; but a band head saw may be substituted without the slightest effect on the workings of this combination.

When the logs have entered the saw mill building they are rolled over the log deck 3 upon its skids 4 to and upon the log carriage 5 which travels on the rails 6 by means of the wheels 7. When a log has been rolled onto the carriage it rests upon the head blocks 8 and against the head block knees 9, where it is held in position by the levers 10.

My improvement consists in an attachment to the usual sawing mechanism of a mill, and is to be used in combination therewith. On the opposite side of the log deck from the head saw, but on the same side of the carriage track, the saws of this attachment are placed. They are placed in substantially the same relation to the log carriage as the head saw and engage the log in a similar way. The carriage track is extended backward so as to permit the log carriage to pass the saws of this attachment in the same manner as it passes the head saw.

Saws 11, 12, 13, and 14 are circular saws revolving in vertical planes parallel with the track of the log carriage. Saws 11 and 12 are placed on the arbor 15, and saws 13 and 14 are placed on the arbor 16. The saw 11 cuts deepest into the log, and it is placed substantially in line with, and the same distance away from the carriage track, as the head saw, and so that the top of it will be as far above the ends of the head blocks 8 as it is desired to have the saw cut into the log. The saws are spaced apart according to the different thicknesses of lumber desired. The kerfs cut by these saws are marked respectively 11', 12', 13', and 14', Fig. 4.

The saws 17, 18, 19 and 20 are circular saws revolving in horizontal planes parallel with the track of the log carriage. Saws 17 and 18 are placed on the arbor 21, and 19 and 20 are placed on the arbor 22. The kerfs cut by these saws are marked respectively 17', 18', 19', and 20', Fig. 4. The saw 17 is so placed that the bottom of its kerf intersects the bottom of the kerf cut by the saw 11; the saw 18 is so placed that the bottom of its kerf is intersected by the kerf cut by the saw 11 and so that its kerf intersects the kerfs cut by the saws 12, 13 and 14 at their respective bottoms; and the saws 19 and 20 are so placed that their kerfs are intersected at their respective bottoms by the kerf cut by the saw 14.

The saws 11, 12, 13, and 14 are driven from the shaft 23 by means of the belt 24 and the pulleys 25, 26, 27, and 28; and the saws 17, 18, 19 and 20 are driven from the same shaft by means of the belt 29 and the pulleys 30, 31, 32, and 33. The shaft 23 is driven from the general source of power used in the mill.

The corners 34, 35, 36, and 37, Fig. 4, are the portions of the log which are sawed into boards by this attachment, while the rest of the log is sawed by the head saw into lumber of such dimensions as may be desired. The kerfs 11', 12', 13', 14', 17', 18', 19', and 20', Fig. 4, show how each corner is sawed. It will be observed that in all these boards or strips the direction of the grain with reference to the face of the board is at an angle of 45 degrees or more. This makes the strips available for flooring and raises their commercial value. Those blocks or portions of the log which are marked 38, 39, 40, and 41 may, after the removal of these corners, be grained as desired by merely turning the log before sawing or by turning the block if it has first been cut away from the log before its reduction to boards. The central portion 42 of the log may under this process of sawing be utilized for lumber of such sizes as the material may dictate.

In certain logs of the larger sizes, particularly Douglas fir and western spruce and hemlock, there is a marked difference between the quality of that material and the size of that grain which are found in the central portion of the log and those which are found nearer the circumference. While the central portion has a coarse grain and is shaky and knotty, the outer portion of the log has generally a very fine grain and is comparatively free from knots and shake. It is, therefore, of the utmost importance to so saw the log as to reduce each portion of it to lumber of the most valuable class that the material is suitable for. This manner of sawing attains this object. Under this method the sawing of the log is accomplished in the following manner: Thin slabs and no more are first taken off in the usual way. When the carriage returns to its place for turning the log in front of the log deck, after the last slab has been removed, the log is not turned but simply set out the distance that it is desired to have the saws of the attachment cut into it; but in place of moving the carriage forward and bringing the log into engagement with the head saw it is this time moved backward and the log is brought into engagement with the saws of the attachment, and one of the corners of the log is reduced to boards in the manner indicated in Fig. 4. The carriage is then returned to its place in front of the log deck, and after the log has been given a quarter turn so as to raise the corner that has been cut into, it is again set out as before, and again brought into engagement with the saws of the attachment; but when the carriage is returned this time it is not stopped for readjustment of the log but continued in its forward motion until the log is brought into engagement with the head saw, and that block or portion of the log which lies between the two corners which have been reduced to boards by the attachment, is then cut away and dropped. The carriage is then returned and the log set out as before and alternately brought into engagement with the saws of the attachment and the head saw, until all corners and all blocks between the corners have been cut away. The remaining central portion of the log is then sawed in the usual way by the head saw, and the blocks between the corners are further handled as cants are handled in saw mills. Thus by the combined action or interaction between the head saw and the saws of my attachment the finely grained portion of the log is so sawed as to give the grain the proper direction with reference to the face of the board; and this is done without interfering with the free use of the rest of the log for lumber of larger dimensions. This is attained by the placing of the saws of my attachment so as to make possible the proper interaction between them and the head saw by the use of the same log carriage and the same log deck for both. This combination may also be used with the same advantage in sawing halved logs or large slabs such as contain two of the corners above mentioned and the block of material between these corners. When so used the same general effect or purpose of correct graining of the wood is attained. The large slab, or one half of a small log, is then put on the carriage with the flat side down, and an obvious rearrangement of the vertical and horizontal saws of the attachment made so as to maintain the same manner of sawing the corners. One corner of this large slab is then set out, and as the carriage is passed backward this corner is engaged by the saws of the attachment and reduced to strips, the inner vertical saw cutting entirely through the slab. The carriage is then reversed, and the middle portion of the slab is set out and brought into engagement with the head saw in the usual way. When only a corner of the slab is left this is turned so as to bring one flat side up against the knees and the other flat side resting on the head blocks. After which the carriage is again passed backward and the corner set out so that the saws of the attachment will engage it and reduce it to strips in the same manner that the other corner was so reduced.

Having thus described my invention I claim:

In a saw mill, the combination of a log carriage, a head saw, a log deck or log turning space, circular saws revolving in vertical planes parallel with and on the side of said carriage, and circular saws revolving in horizontal planes parallel with and on the side of said carriage, all of said circular saws being so placed that the said log deck or log turning space intervenes between them and the head saw, all substantially as described.

Dated at 67 East Twentieth street, Portland, Oregon, this 24th day of May 1910.

ANTON S. FROSLID.

Witnesses:
T. J. GLOVER,
RALPH H. BAUGHMAN.